United States Patent [19]

Lansbergen et al.

[11] Patent Number: 5,547,698
[45] Date of Patent: Aug. 20, 1996

[54] EDIBLE FATS

[75] Inventors: Adrianus J. Lansbergen; Robert Schijf, both of Vlaardingen, Netherlands

[73] Assignee: Van Den Bergh Foods Co. Division of Conopco Inc., New York, N.Y.

[21] Appl. No.: 71,350

[22] Filed: Jun. 3, 1993

Related U.S. Application Data

[63] Continuation of Ser. No. 680,186, Apr. 3, 1991, abandoned.

[30] Foreign Application Priority Data

Apr. 3, 1990 [GB] United Kingdom ............... 9007497

[51] Int. Cl.⁶ ........................................ A23D 7/00
[52] U.S. Cl. .................... 426/602; 426/601; 426/603
[58] Field of Search .................... 426/601, 602, 426/603, 604, 606, 607, 611, 660, 804

[56] References Cited

U.S. PATENT DOCUMENTS

| | | | |
|---|---|---|---|
| 2,855,311 | 10/1958 | Nelson | 426/603 |
| 3,298,837 | 1/1967 | Seiden . | |
| 3,361,568 | 1/1968 | Kidger . | |
| 3,425,842 | 2/1969 | Japikse | 426/603 |
| 3,600,195 | 8/1971 | Westenberg . | |
| 3,796,581 | 3/1974 | Frommhold | 426/601 |
| 4,016,302 | 4/1977 | Kattengerg et al. | 426/607 |
| 4,341,812 | 7/1982 | Ward . | |
| 4,341,813 | 7/1982 | Ward . | |
| 4,482,576 | 11/1984 | Boot et al. | 426/601 |
| 4,501,764 | 2/1985 | Gercama et al. | 426/607 |
| 4,610,889 | 9/1986 | Schmidt | 426/603 |

FOREIGN PATENT DOCUMENTS

| | | |
|---|---|---|
| A0084900 | 8/1983 | European Pat. Off. . |
| A0196780 | 10/1986 | European Pat. Off. . |
| 0227364 | 7/1987 | European Pat. Off. . |
| 0322027 | 6/1989 | European Pat. Off. . |
| 60-53598 | 3/1985 | Japan . |
| 62-81497 | 4/1987 | Japan . |
| 988522 | 4/1965 | United Kingdom . |
| A1205729 | 9/1970 | United Kingdom . |

OTHER PUBLICATIONS

Swern, D. ed., Bailey's Industrial Oil and Fat Products, vol. 2, Fourth Edition, 1982, pp. 159–164, John Wiley & Sons, New York.
Oleagineux, vol. 41, No. 5, 1986, pp. 235–240, S. Majumdar, D. K. Bhattacharyya 'Trans Free Vanaspati From Palmsterin and Vegetable Oils by Interesterification Process'.
Chemical Abstract 103:213793t of JP 6,053,598.
Chemical Abstract 107:133051s of JP 6,281,497.

*Primary Examiner*—Leslie Wong
*Attorney, Agent, or Firm*—Cushman Darby & Cushman, LLP

[57] ABSTRACT

The invention relates to improvements in edible fats, in particular to improved hardstocks for use in spreads having a low content of saturated fat and to spreads containing these hardstocks. Edible spreads should contain particularly low levels of C-16 saturated fatty acids and low levels of trans fatty acids. Accordingly, the invention provides a fat blend, for use as a hardstock in an edible emulsion spread, obtainable by interesterification of a fat rich in behenic acid together with a fat rich in palmitic and/or stearic acid such that in the interesterified mixture the behenic acid content is at least 5% and the sum of palmitic and stearic acid content is at least 50%. Such hardstock fats may be obtained by interesterification of 10%–90% (by weight) wet fractionated palm stearin (80% palmitic acid) with 90%–10% (by weight) fully hydrogenated high erucic rapeseed oil. The preferred ratio of components is 60% of the behenic acid source and 40% of the palmitic and/or stearic acid source.

14 Claims, No Drawings

EDIBLE FATS

This is a continuation of application Ser. No. 07/680,186, filed Apr. 3, 1991, now abandoned.

FIELD OF THE INVENTION

The present invention relates to improvements in edible fats, in particular to improved hardstocks for use in spreads having a low content of saturated fat and to spreads containing these hardstocks.

BACKGROUND OF THE INVENTION

A vast number of edible fats are available for use in the manufacture of spreads and other fat containing foodstuffs. The rheological properties of these fats span a very wide range from low melting liquid oils to high melting fats with considerable variation in the shape and slope of melting and crystallization curves. In edible spreads it is desirable to use a liquid oil as the bulk of the fat, both for reasons of economy and nutrition. Consequently, the so-called "hardstocks" are needed to provide the structural component of spreads in the form of a fat in a crystalline phase at room temperature.

It is well accepted that the saturated fat content of the diet should be rather low. As hardstocks by necessity contain saturated fats, the quantity of hardstock in a product should be minimised. There is a need for hardstocks which function well at very low levels without a bad influence on the 'oral melt' of the product. A bad oral melt is a particular problem when the hardstock contains very high levels of saturated fatty acids as TAG's and in particular when the hardstock contains tripalmitic and tristearic TAG's.

A commonly used hardstock comprises a hydrogenated and interesterified blend of a palm oil (rich in C-16 and C-18 saturated fatty acids) with a so-called lauric fat (rich in C-12 saturated fatty acids). The best known examples of the lauric fats include coconut and palm kernel fats although a number of other tropical palm oils fall into this classification.

"BAILEY's industrial oil and fat products" Volume 2 fourth edition at page 159 describes how short chain fatty acids (C6–C14) improve the melting properties of spreads, while long chain fatty acids (C20–C22) provide stiffening power. BAILEY's goes on to describe how it is well known that both these properties can be combined using interesterified oil blends such as coconut/palm blends (as mentioned above), and coconut/hardened rape blends.

It must be appreciated that at least two different types of rapeseed oils are known. Originally, only so-called "high erucic acid" rapeseed or "HEAR" oil was known. Developments in crop breeding led to the production of so-called "low erucic acid rape", or "LEAR" oils. It is this second oil which is used in edible products.

FR 2570388 (GERSCHEL) discloses a fat composition for the manufacture of margarine produced by the interesterification of a hydrogenated vegetable oil including a low erucic acid rapeseed oil (colza) with a source of palmitic acid, such as palm fractions and technical tripalmitin. This is used as a hardstock ('mixed with fluid vegetable oil') in margarine manufacture. Looking at the GERSCHEL specification it can be appreciated that the rape seed oil is only partially hydrogenated and because it is low erucic acid rape oil it is rich in C-18 fatty acids. Although these products have good oral melting properties, with 20% hardstock levels, partially hydrogenated fats contain both cis and trans monosaturates, and these products are not acceptable to consumers, who wish to minimise their intake of trans fatty acids.

Edible fats are also subject to considerable variation in price. In particular, the lauric fats and other so-called "tropical" fats are cheap at present but may become more expensive in the future whereas liquid oils obtainable from more temperate crops are also relatively cheap but likely to remain so. A further problem with 'tropical fats' is that they are rich in C-16 fatty acids and is believed by some medical authorities that the intake of C-16 saturated fatty acids should be reduced. Most other edible oils and fats contain low levels of C-16 fatty acids and in particular edible liquid vegetable oils are rich in the nutritionally desirable C-18 unsaturated fatty acids.

Faced with the problems of tropical fats, workers have developed the techniques of "directed interesterification" to enable liquid vegetable oils to be used in spread hardstock production. However, directed interesterification is an expensive alternative to the use of these tropical fats.

DETAILED DESCRIPTION OF THE PREFERRED EMBODIMENTS

We have now determined that hardstocks containing C16 (Palmitic—"P") or C18 (Stearic—"S") and C22 (Behenic—"B") saturated fatty acids combine structuring properties with a good oral melt when present at relatively low levels. In particular, our hardstocks comprise mixed triglycerides of P and/or S, and B fatty acid residues, in particular B2P and B2S TAGs. This reduces the level of use of tropical fats (normally present as P2M TAGs) and avoids use of directed interesterification. Moreover, these products contain low and preferably almost zero levels of trans fatty acids as the fats present are substantially fully hydrogenated.

Accordingly a first aspect of the present invention provides a fat blend, for use as a hardstock in an edible emulsion spread, obtainable by interesterification of a fat rich in behenic acid together with a fat rich in palmitic and/or stearic acid such that in the interesterified mixture the behenic acid content is at least 10% and the sum of palmitic and stearic acid content is at least 50%.

Typically, such hardstock fats may be obtained by interesterification of 10%–90% (by weight) wet fractionated palm stearin (80% palmitic acid) with 90%–10% (by weight) fully hydrogenated high erucic rapeseed oil. The preferred ratio of components is 40% of the behenic acid source and 60% of the palmitic and/or stearic acid source. For convenience it is noted that so called "wet fractionated palm stearin" comprises some 80% by weight of palmitic acid whereas high erucic acid rapeseed oil hardened to a slip-melting point of around 70° C. comprises around 48% behenic acid, the remainder being mainly C-18 fatty acids.

Typically, the hardstock and therefore the interesterified fat blend comprises around 27% behenic, 35% palmitic and 35% stearic acids.

Without wishing to be bound by theory, it is believed that the novel hardstocks with saturated C16/C22+C18/C22 (palmitic/behenic) fatty acids (length ratio: 0.73) are in their behaviour as hardstocks similar to the known hardstocks with saturated C12/C16 (lauric/palmitic) fatty acids (length ratio:0.75). The ratio for the C12/C22 (lauric/behenic) fatty acids, as mentioned above, is 0.55. The corresponding ratio for C18/C22 (stearic/behenic) fatty acids is 0.82. It is also expected that other randomised components of the fat blend will play some part in the behaviour of the blend as a hardstock.

Suitable sources of palmitic acid are fractions of palm oil, particularly wet or dry fractionated palm stearins and technical tripalmitin. The use of other sources of palmitic acid (such as genetically engineered plants) is not excluded.

Suitable sources of stearic acid are fully hydrogenated sunflower oil, safflower oil, soybean oil, corn oil, olive oil, and low erucic rapeseed oil.

Suitable sources of behenic acid are fully hardened high erucic acid rapeseed oil, fish oils and mustard seed oil. These fully hardened oils have a low content of trans fatty acids. Low erucic acid rapeseed oil has a low behenic acid content.

While the method of obtaining the fats disclosed herein is principally a chemical engineering method, the use of techniques of genetic engineering is not excluded. In particular, it is envisaged a medium erucic acid rapeseed oil rich in stearic and behenic acids randomised after hydrogenation to saturation would produce the hardstocks of the present invention. Such an oil can be produced by blending of low and high erucic acid rapeseed oils. This allows the preparation of a "one oil spread" with both hardstock and liquid-oil fat phase components derived from rapeseed fats.

Spreads including the present hardstock are included within the scope of the present invention, whether comprising rapeseed fats alone or not.

It is envisaged that as in the examples given hereafter the liquid oil component of the fat phase will generally be a liquid vegetable oil such as sunflower, safflower, groundnut or soybean oil, all of which contain relatively low levels of saturated fatty acids.

While the invention is described hereafter with particular reference to fat-continuous spreads comprising high levels of fat (around 80%) the hardstock of the present invention can find embodiment in spreads comprising 60%, 40% or even lower levels of fat. The production of water continuous spreads is not to be excluded. Spreads containing upwards of 60% fat can be used for frying and can further comprise suitable anti-spattering agents but it is suggested that spreads with lower fat levels, particularly 40% wt fat and lower are not used for this purpose. One or more of the fatty components of the oil phase may comprise a fat replacer such as a sucrose fatty acid ester. One or more of the components of the water-phase may comprise a fat replacer such as a finely dispersed protein.

In order that the present invention may be further understood it will be explained hereafter with reference to the following illustrative examples.

EXAMPLES

A margarine was prepared with the following formulation (all percentages being given in wt %):

| | |
|---|---|
| Hard fat component | 4.90% |
| Sunflower oil | 76.80% |
| Monoglyceride | 0.10% |
| Lecithin | 0.10% |
| Beta carotene | trace |
| Total fat phase | 82.00% |
| Water | 17.83% |
| Skim milk powder | 0.12% |
| K sorbate | 0.05% |
| Citric acid | (to pH 4.6) |
| Total water phase | 18.00% |

The hard fat (hardstock) component used at 6% on fat phase in both cases was either:

[A]: an interesterified blend (according to the present invention) of 40% wt wet fractionated palm stearin, and, 60% wt of fully hardened high erucic rapeseed oil with a slip melting point of 70° C., or,

[B]: a simple mixture (as a comparative example) of 40% wt wet fractionated palm stearin, and, 60% wt of fully hardened rapeseed oil with a slip melting point of 70° C.

Example 1

The spread according to both fat phase formulations, [A] and [B], was prepared according to the following process. Temperature measurements given are for the products made with the [A] fat phase:

All components of the spread were mixed together to form a premix at a temperature of 55° C.

The premix was pumped at rate of 4.5 kg/h into a first "VOTATOR" A-unit rotating at 800 rpm with a cooling jacket temperature of −8° C., an annulus of 3 mm spacing and a residence time of 15 seconds. The process stream outlet temperature for this unit was 12.5° C. and the solids content was measured at 4.2% by NMR.

From the first A-unit the process stream flowed to a second "VOTATOR" A-unit rotating at 800 rpm with a cooling Jacket temperature of −3° C., an annulus of 3 mm spacing and a residence time of 15 seconds. The process stream outlet temperature for this unit was 4.8° C. and the solids content was measured at 5.0% by NMR.

From the second A-unit the process stream was pumped to a "VOTATOR" C-unit rotating at 250 rpm with a cooling jacket temperature of +13° C., a volume of 100 ml and a residence time of 120 seconds. The process stream outlet temperature for this unit was 8.5° C. and the solids content was measured at 4.7% by NMR.

The product was filled into tubs.

The following physical properties were measured for the product according to the invention [A] and the comparative example [B]:

| Sample | A | B |
|---|---|---|
| Solids content at stated temperature (%): | | |
| N-10 | 7.4 | 6.1 |
| N-20 | 5.4 | 4.7 |
| N-30 | 3.9 | 3.7 |
| N-35 | 2.5 | 2.2 |
| Stevens value for consistency at temperature: | | |
| S-05 | 47 | 20 |
| S-10 | 44 | 19 |
| S-15 | 47 | 19 |
| S-20 | 32 | 19 |
| Hardness value at stated temperature (calculated from Stevens value): | | |
| C-05 | 210 | 95 |
| C-10 | 195 | 90 |
| C-15 | 210 | 90 |
| C-20 | 150 | 90 |

It can be seen that the products according to the invention exhibit much improved consistency over the control products.

Whereas the consistency and hardness of the products of the invention are high at lower temperatures and remain quite high at room temperature, products made without the interesterified hardstock but otherwise comprising the same components are too soft for use as spreads at a range of temperatures.

We claim:

1. In an edible water-in-oil emulsion spread comprising a liquid vegetable oil phase and hardstock, the improvement whereby the content of saturated fats and trans fatty acids is reduced, said improvement comprising the use, as the hardstock component, of:

an interesterified mixture having a behenic acid content of at least 8% and having a palmitic and stearic acid content totaling at least 50%, the interesterified mixture being obtained by interesterification of a source fat rich in behenic acid content with a source fat rich in palmitic acid, stearic acid or mixtures of palmitic and stearic acid, said source fat rich in behenic acid being selected from the group consisting of fully hardened high erucic acid rapeseed oil, fish oils, mustard seed oil and mixtures thereof.

2. A spread according to claim 1, wherein the interesterified mixture comprises: at least 10% behenic acid content.

3. A spread according to claim 1, wherein the source fat rich in palmitic acid, stearic acid or mixtures of palmitic and stearic acid is 10% to 90% by weight palm stearin.

4. A spread according to claim 1, wherein the source fat rich in behenic acid comprises 90% to 10% by weight fully hydrogenated high erucic rapeseed oil.

5. A spread according to claim 1, wherein about 40% of the source fat rich in behenic acid and about 60% of the source fat rich in palmitic acid, stearic acid or mixtures of palmitic and stearic acid are interesterified.

6. A spread according to claim 1, wherein the source fat rich in palmitic acid, stearic acid or mixture of palmitic and stearic acid comprises more than 60% by weight of palmitic acid.

7. A spread according to claim 1, wherein the source fat rich in behenic acid comprises more than 30% behenic acid.

8. A spread according to claim 1, wherein the source fat rich in palmitic acid, stearic acid or mixtures of palmitic and stearic acid is selected from the group consisting of wet or dry fractionated palm stearins, technical tripalmitin, fully hydrogenated sunflower oil, safflower oil, soybean oil, corn oil, olive oil, low erucic rapeseed oil, and mixtures thereof.

9. A spread according to claim 1, wherein the interesterified mixture comprises less than 10% weight trans fatty acids.

10. A spread according to claim 9, wherein the interesterified mixture comprises less than 5% weight trans fatty acids.

11. A spread according to claim 10, wherein the interesterified mixture comprises almost zero trans fatty acids.

12. The spread of claim 1 wherein the interesterified mixture is obtained by interesterifying 90%–10% by weight fully hydrogenated high erucic rapeseed oil and 10%–90% by weight wet fractionated palm stearin.

13. The spread of claim 12 obtained by interesterifying 60% by weight of said wet fractionated palm stearin and 40% by weight of said fully hydrogenated high erucic rapeseed oil.

14. An edible water in oil emulsion spread comprising:

an interesterified mixture having a behenic acid content of at least 8% and having a palmitic and stearic acid content totaling at least 50%, the interesterified mixture obtained by interesterification of a source fat rich in behenic acid content with a source fat rich in palmitic acid, stearic acid or mixtures of palmitic and stearic acid, said source fat rich in behenic acid being selected from the group consisting of fully hardened high erucic acid rapeseed oil, fish oils, mustard seed oil and mixtures thereof, (b) a liquid vegetable oil in a proportion to the interesterified mixture such that the overall level of saturated fats present in the spread is less than 15%.

* * * * *